United States Patent
Deobald et al.

(10) Patent No.: US 9,592,651 B2
(45) Date of Patent: Mar. 14, 2017

(54) COMPOSITE STRUCTURES HAVING REDUCED AREA RADIUS FILLERS AND METHODS OF FORMING THE SAME

(71) Applicant: The Boeing Company, Chicago, IL (US)

(72) Inventors: Lyle R. Deobald, Shoreline, WA (US); Aaron N. Rinn, Edmonds, WA (US); Ying Shan, Mukilteo (CN); Madhavadas Ramnath, Everett, WA (US); Derek P. Vetter, Olympia, WA (US); Kenneth H. Griess, Kent, WA (US); Michael J. Graves, Seattle, WA (US)

(73) Assignee: The Boeing Company, Chicago, IL (US)

( * ) Notice: Subject to any disclaimer, the term of this patent is extended or adjusted under 35 U.S.C. 154(b) by 160 days.

(21) Appl. No.: 14/503,368

(22) Filed: Sep. 30, 2014

(65) Prior Publication Data

US 2016/0089856 A1    Mar. 31, 2016

(51) Int. Cl.
| | | |
|---|---|---|
| *B64C 1/00* | (2006.01) | |
| *B32B 7/04* | (2006.01) | |
| *B64C 1/06* | (2006.01) | |
| *B32B 7/12* | (2006.01) | |
| *B32B 5/02* | (2006.01) | |
| *B29D 99/00* | (2010.01) | |
| *B29C 70/30* | (2006.01) | |

(52) U.S. Cl.
CPC ............... *B32B 7/04* (2013.01); *B29C 70/30* (2013.01); *B29D 99/0014* (2013.01); *B32B 5/02* (2013.01); *B32B 7/12* (2013.01); *B64C 1/06* (2013.01); *B32B 2605/18* (2013.01); *Y02T 50/433* (2013.01)

(58) Field of Classification Search
None
See application file for complete search history.

(56) References Cited

U.S. PATENT DOCUMENTS

| | | | | | |
|---|---|---|---|---|---|
| 4,109,435 | A | * | 8/1978 | Loyd | B29C 65/562 156/92 |
| 4,113,910 | A | * | 9/1978 | Loyd | B29C 66/112 244/120 |
| 4,177,306 | A | * | 12/1979 | Schulz | B29C 70/085 428/107 |
| 4,206,895 | A | * | 6/1980 | Olez | B29C 65/62 156/93 |
| 4,219,980 | A | * | 9/1980 | Loyd | B29C 65/562 156/92 |
| 4,256,790 | A | * | 3/1981 | Lackman | B29C 66/112 156/93 |

(Continued)

FOREIGN PATENT DOCUMENTS

WO    WO 2014031047 A1 *  2/2014  ......... B29D 99/0014

OTHER PUBLICATIONS

Extended European Search Report, mailed Feb. 15, 2016, for corresponding EP application EP15187722.2-1703, Applicant The Boeing Company, 8 pages.

*Primary Examiner* — Medhat Badawi

(57) ABSTRACT

A composite structure having a base charge and an outer channel charge is provided. The outer channel charge has an inner radius and an outer radius. A charge of plies adjacent to the inner radius reduces the inner radius.

20 Claims, 13 Drawing Sheets

(56) References Cited

U.S. PATENT DOCUMENTS

| | | | | |
|---|---|---|---|---|
| 4,331,495 A * | 5/1982 | Lackman | ............... | B29C 70/865 |
| | | | | 112/423 |
| 4,331,723 A * | 5/1982 | Hamm | ................. | B29C 70/865 |
| | | | | 156/293 |
| 4,789,594 A * | 12/1988 | Stawski | ................... | B26D 1/02 |
| | | | | 156/222 |
| 4,992,317 A * | 2/1991 | Chess | ................... | B29C 70/543 |
| | | | | 156/93 |
| 5,026,595 A * | 6/1991 | Crawford, Jr. | .......... | B29C 70/24 |
| | | | | 428/193 |
| 5,217,766 A * | 6/1993 | Flonc | ..................... | B29B 11/16 |
| | | | | 156/222 |
| 5,589,015 A * | 12/1996 | Fusco | ................... | B29C 65/562 |
| | | | | 156/303.1 |
| 5,639,535 A * | 6/1997 | McCarville | ............. | B29C 70/30 |
| | | | | 156/182 |
| 5,789,061 A * | 8/1998 | Campbell | ............. | B29C 65/564 |
| | | | | 156/73.1 |
| 5,827,383 A | 10/1998 | Campbell et al. | | |
| 5,833,786 A * | 11/1998 | McCarville | ............... | B64C 1/06 |
| | | | | 156/92 |
| 5,919,413 A * | 7/1999 | Avila | ................. | B29C 66/8122 |
| | | | | 156/303.1 |
| 5,919,543 A * | 7/1999 | McCarville | ........... | B29C 70/345 |
| | | | | 156/182 |
| 6,562,436 B2 * | 5/2003 | George | ..................... | B32B 5/12 |
| | | | | 428/105 |
| 6,689,448 B2 | 2/2004 | George et al. | | |
| 6,709,538 B2 | 3/2004 | George et al. | | |
| 7,531,058 B2 * | 5/2009 | Grose | ........................ | B32B 3/02 |
| | | | | 156/304.3 |
| 7,534,319 B2 * | 5/2009 | Mead | ......................... | B32B 7/12 |
| | | | | 156/160 |
| 7,541,083 B2 * | 6/2009 | Grose | ................... | B29C 65/527 |
| | | | | 244/131 |
| 7,625,623 B2 | 12/2009 | Grose et al. | | |
| 7,823,490 B2 * | 11/2010 | Evans | ...................... | B26D 3/02 |
| | | | | 83/39 |
| 7,874,829 B2 * | 1/2011 | Kirkendall | ............. | B26D 1/225 |
| | | | | 425/298 |
| 8,540,833 B2 | 9/2013 | Deobald et al. | | |
| 8,763,253 B2 * | 7/2014 | Kamaraj | ................. | B29C 70/34 |
| | | | | 29/897 |
| 2005/0051262 A1 * | 3/2005 | Erickson | ............... | B29C 70/342 |
| | | | | 156/245 |
| 2009/0317587 A1 * | 12/2009 | Deobald | ............... | B29C 70/865 |
| | | | | 428/119 |
| 2010/0140834 A1 * | 6/2010 | Sherwood | ............. | B29C 47/786 |
| | | | | 264/211.12 |
| 2010/0252179 A1 * | 10/2010 | Schoppmeier | .......... | B29C 70/32 |
| | | | | 156/172 |
| 2012/0237157 A1 * | 9/2012 | Zhang | .................. | G02B 27/283 |
| | | | | 385/11 |
| 2015/0367619 A1 * | 12/2015 | Butler | ................... | B29C 70/545 |
| | | | | 428/57 |
| 2016/0089856 A1 * | 3/2016 | Deobald | ................... | B32B 7/04 |
| | | | | 244/119 |

* cited by examiner

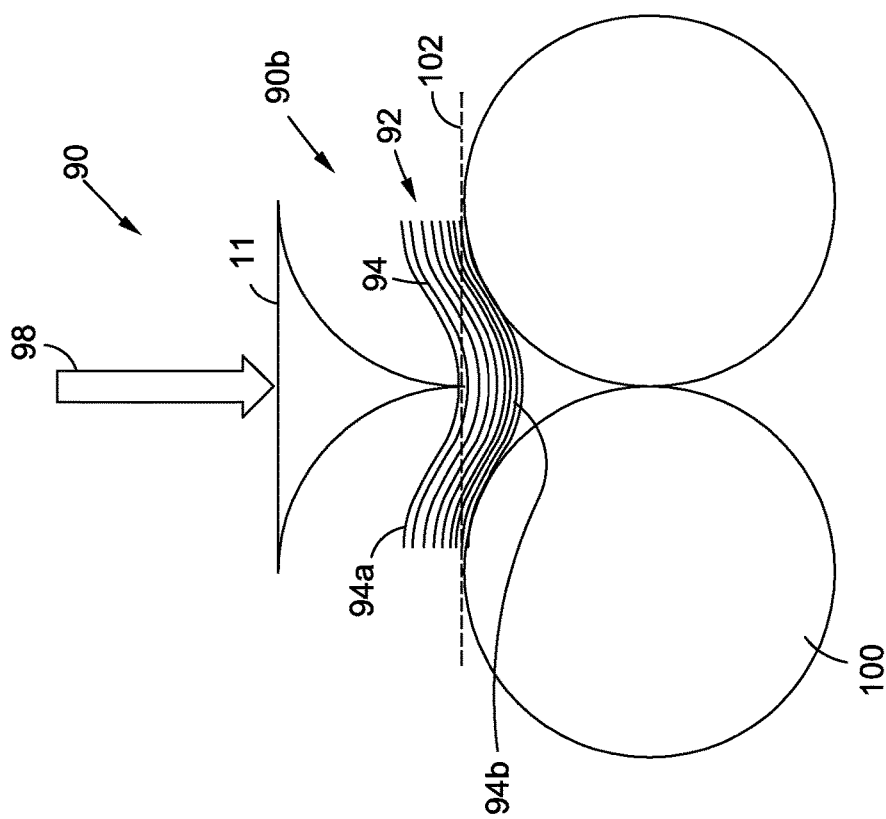
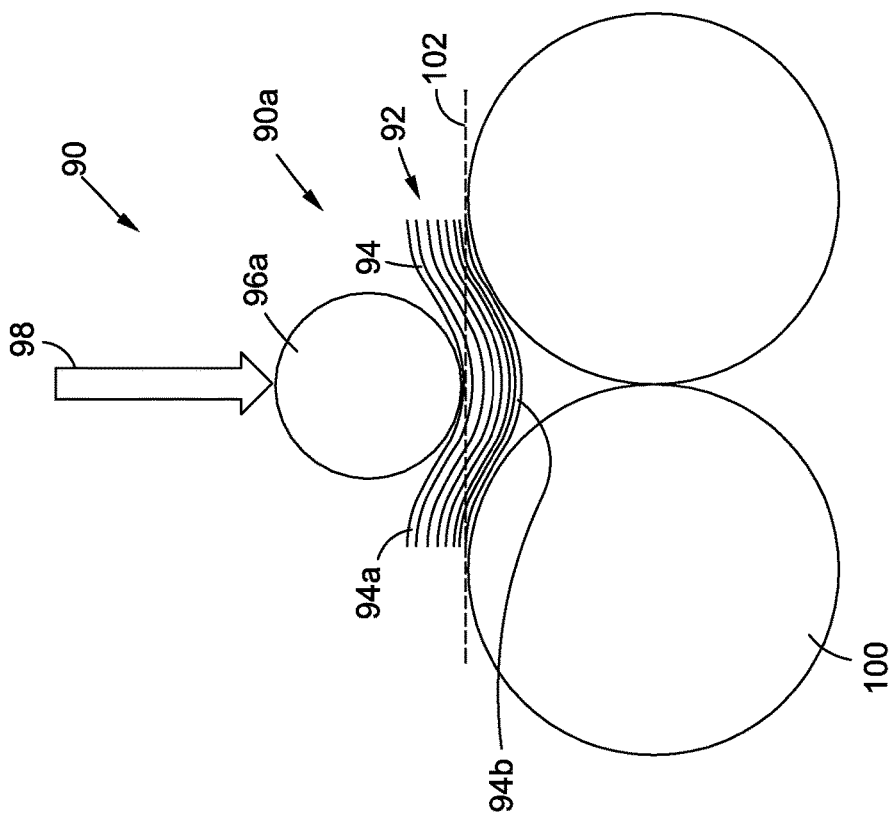

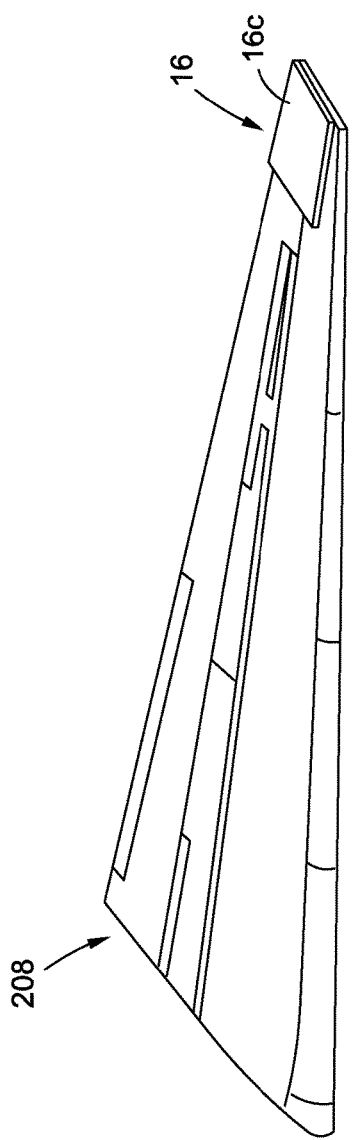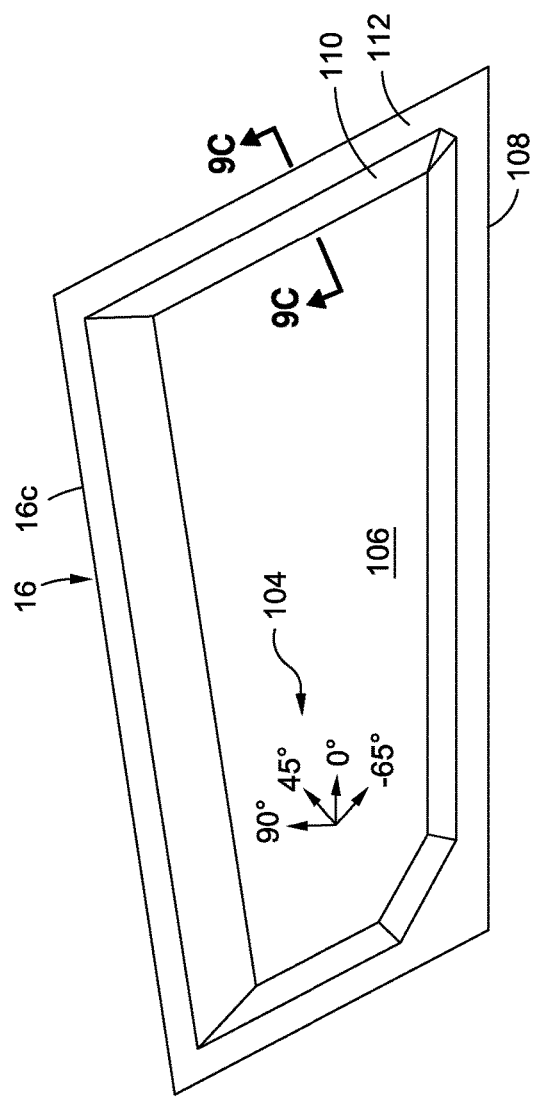

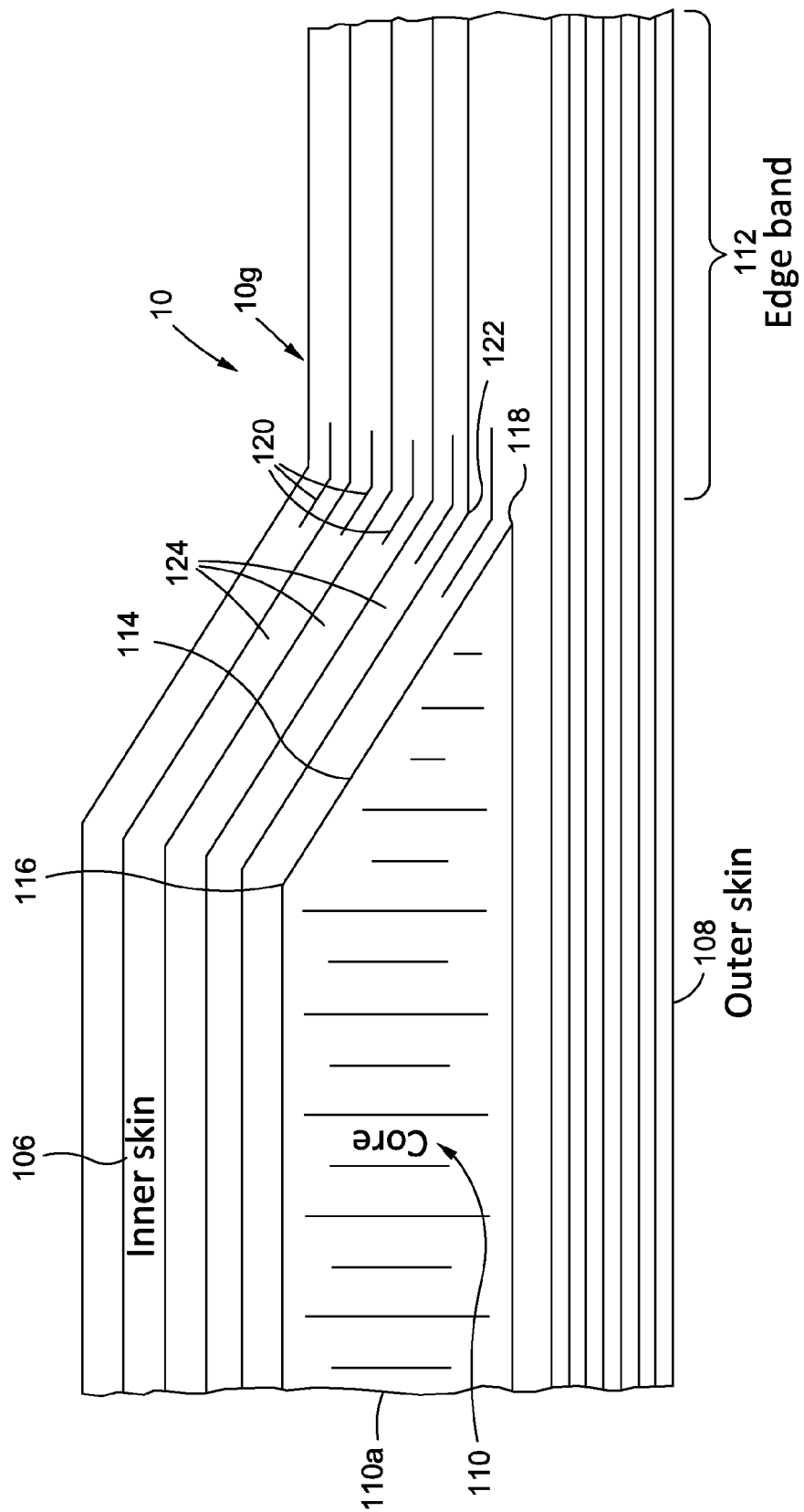

COMPOSITE STRUCTURES HAVING REDUCED AREA RADIUS FILLERS AND METHODS OF FORMING THE SAME

BACKGROUND

1) Field of the Disclosure

The disclosure relates generally to composite structures and methods of forming the same, and more specifically, to composite structures having reduced area radius fillers and methods of forming the same, such as for stringer composite structures in aircraft wings.

2) Description of Related Art

Composite structures are used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. In aircraft construction, composites structures are used in increasing quantities to form the wings, fuselage, tail sections, and other components.

For example, aircraft wings may be formed of composite stiffened panel structures comprising composite skin panels or webs to which reinforcing stiffeners or "stringers" may be attached or bonded to improve the strength, stiffness, buckling resistance, and stability of the composite skin panels or webs. The stringers attached or bonded to the composite skin panels or webs may be configured to carry various loads and may be provided in a variety of different cross-sectional shapes, such as I-beams, T-stiffeners, and J-stiffeners.

Known stringers found in aircraft composite wing structures may have a low pull-off strength. Consequently, such stringers may not be loaded through a stringer blade portion. This may require that holes be drilled in the wing skin and that fasteners be attached through the wing skin to attach, for example, wing rib fittings to the wing skin. However, this may create additional areas on the aircraft subject to possible fuel leaks or manufacturing issues and complications.

Moreover, such fasteners may need to be treated and triple protected for lightening strike protection, and such fastener holes may require liquid tight sealing so that they are not subject to fuel leaks. For example, such fasteners protruding into a fuel cell in the wing may need to be countersunk, coated on the outside with an insulating plug, coated on the inside with an insulating sealant, and grounded to prevent sparking inside of the fuel cell. The time required for installing such fasteners may be increased, which, in turn, may increase manufacturing complexity and cost. In addition, the presence of additional fasteners may add weight to the aircraft, which, in turn, may reduce the payload capacity of the aircraft and may increase fuel consumption, which may result in increased fuel costs.

Void regions may be formed by the radius of curved portions of the stringers when they are attached or joined perpendicularly to composite skin panels or webs. Such void regions may typically be referred to as "radius filler regions" or "noodles". Such radius filler regions or noodles within stringers may be prone to cracking because they may be three-dimensionally constrained. Radius fillers or noodles made of composite material or adhesive/epoxy material and having a generally triangular cross-section may be used to fill the radius filler regions or noodles in order to provide additional structural reinforcement to such regions. However, known radius fillers or noodles may be made of a material that is different from or not compatible with the material of the composite structure surrounding the radius filler or noodle. This may result in different material properties which may, in turn, require modifications to cure cycles, processing temperatures and pressures, and/or relative amounts of fibers and resin matrices. Such modifications may increase manufacturing time, labor and costs.

A difference in coefficients of thermal expansion (CTE) of the radius filler or noodle material and the material of the composite structure surrounding the radius filler or noodle may cause the radius filler or noodle to be susceptible to thermal cracking. In addition, known unidirectional tape radius fillers or noodles may be susceptible to thermal cracking after curing, if a stiffener cross-sectional area becomes very large. For example, known designs using one large radius filler or noodle may be susceptible to cracking due to increased CTE differences between the large radius filler and the surrounding laminate structure.

To prevent such known unidirectional tape radius fillers or noodles from thermal cracking, the unidirectional tape radius fillers or noodles may be wrapped in fabric to prevent the thermal cracking from spreading to surrounding structures. However, such fabric may need to be applied manually to the surrounding structure, such as the stringer, and this may result in additional manufacturing time, labor, and costs, as well as an increase in possible errors.

Further, known unidirectional/laminate radius fillers or noodles may have relatively blunt tips on the three corners of the radius filler or noodle. A zero degree (0°) ply of pre-preg (i.e., reinforcement fibers impregnated with a resin material) may be folded over itself repeatedly to form a circular radius filler or noodle. The radius filler or noodle may then be formed into a triangular shape under heat and vacuum. The blunt noodle tip may create resin rich pockets at the tips of the radius filler or noodle, and such regions may be susceptible to initiation of crack propagation. The crack may spread between composite plies and the crack may cause premature stringer pull-off strength issues. A low pull-off strength may prevent the stringers from being used as structural attachment points inside the wing box. This, in turn, may require, as discussed above, that holes be drilled in the wing skin and that fasteners be attached through the wing skin to attach wing rib fittings to the wing skin.

Accordingly, there is a need in the art for composite structures having reduced area radius fillers and methods of forming the same that provide advantages over known structures and methods.

SUMMARY

This need for composite structures having reduced area radius fillers and methods of forming the same is satisfied. As discussed in the below detailed description, embodiments of the composite structures having reduced area radius fillers and methods of forming the same may provide significant advantages over known structures and methods.

In one embodiment of the disclosure, there is provided a composite structure. The composite structure comprises a base charge and an outer channel charge. The outer channel charge has an inner radius and an outer radius. The composite structure further comprises a charge of plies adjacent to the inner radius that reduce the inner radius.

In another embodiment of the disclosure, there is provided an aircraft. The aircraft comprises a fuselage and at least one wing coupled to the fuselage. The at least one wing has a composite structure. The composite structure comprises a base charge and an outer channel charge, wherein the outer channel charge has an inner radius and an outer radius. The composite structure further comprises a charge of plies adjacent to the inner radius that reduce the inner radius.

In another embodiment of the disclosure, there is provided a method for forming a composite structure having a reduced area radius filler. The method comprises the step of forming an outer channel charge having a web portion, a flange portion, and a radius filler region, wherein the outer channel charge has in inner radius and an outer radius.

The method further comprises the step of joining the web portion of the outer channel charge to a base charge. The method further comprises the step of adding a charge of plies adjacent to the inner radius to reduce the inner radius. The method further comprises the step of coupling to the radius filler region a radius filler having a radius that substantially corresponds to the reduced inner radius. The method further comprises the step of processing the composite structure to form a composite structure having the reduced area radius filler.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 8A is an illustration of a schematic diagram of an embodiment of a radius filler fabrication process that may be used to form the reduced area radius filler of the composite structure;

FIG. 8B is an illustration of a schematic diagram of another embodiment of a radius filler fabrication process that may be used to form the reduced area radius filler of the composite structure;

FIG. 9A is a back perspective view of an upper trailing edge panel of a wing of an aircraft that may incorporate an exemplary composite structure having a reduced area radius filler that may be formed with an embodiment of a method of the disclosure;

FIG. 9B is an enlarged top view of the upper trailing edge panel of FIG. 9A;

FIG. 9C is a cross-sectional view taken along lines 9C-9C of FIG. 9B;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
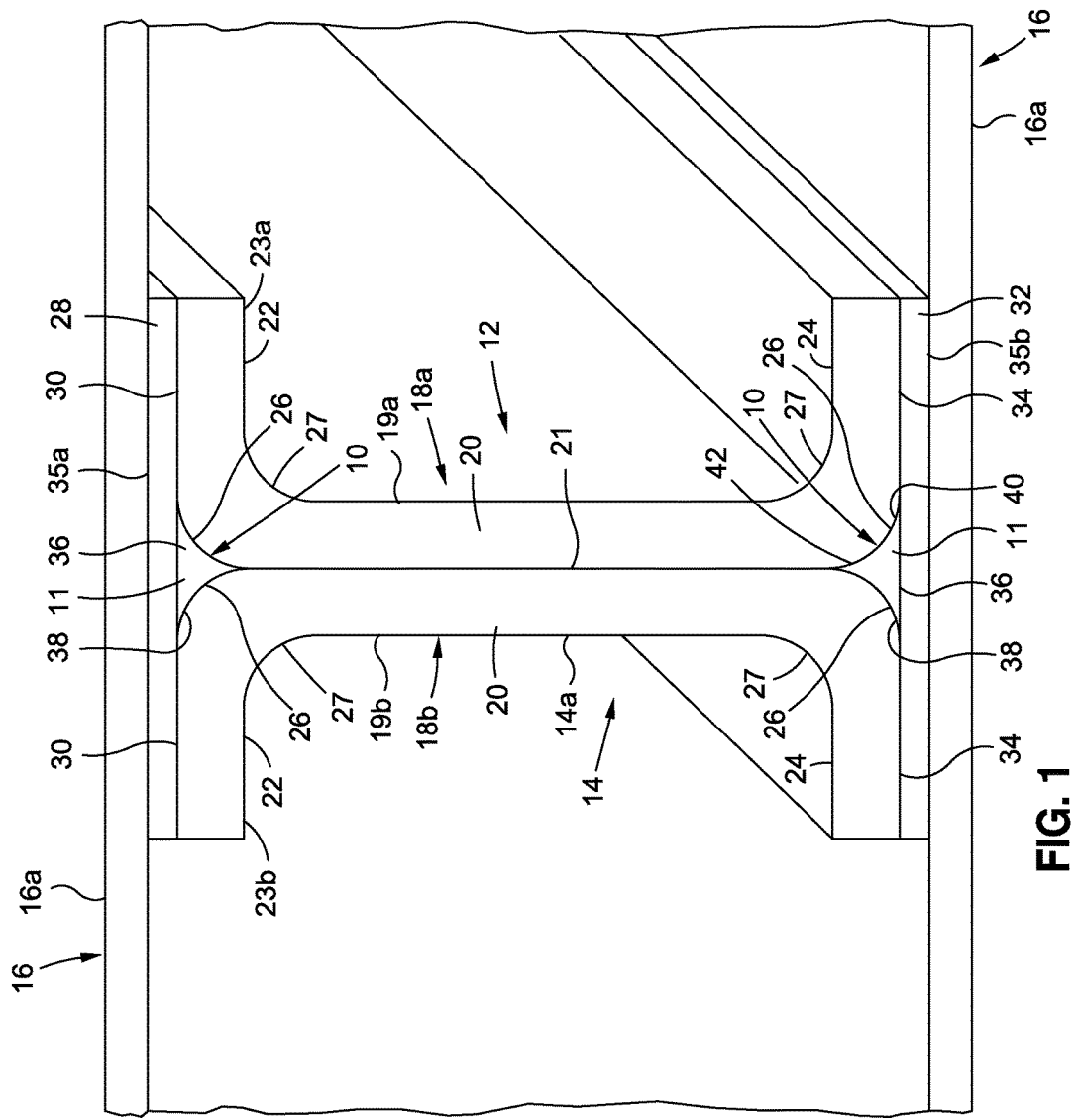
FIG. 1 is an illustration of a perspective view of an exemplary composite structure having a reduced area radius filler that may be formed with an embodiment of a method of the disclosure.

Now referring to the Figures, FIG. 1 is an illustration of a perspective view of an exemplary composite structure 12 having a reduced area radius filler 10 that may be formed with an embodiment of a method 150 (see FIG. 10) of the disclosure. In one embodiment of the disclosure, there is provided the composite structure 12 (see FIG. 1). Preferably, the composite structure 12 (see FIG. 1) comprises a composite stiffener 14, such as an I-section composite stiffener 14a having a generally I-shaped cross-section. The composite structure 12 (see FIG. 1) comprises a base charge 32 (see FIG. 1) and an outer channel charge 18a (see FIG. 1). The outer channel charge 18a (see FIG. 1) has an inner radius 26 (see FIG. 1) and an outer radius 27 (see FIG. 1). The base charge 32 (see FIG. 1) and the outer channel charge 18a (see FIG. 1) preferably comprise composite structures 12 for an aircraft 200a (see FIG. 11). The composite structure 12 (see FIG. 1) further comprises a charge of plies 60 (see FIGS. 2-7) adjacent to the inner radius 26 (see FIG. 1) that reduce the inner radius 26 (see FIG. 1).

As shown in FIG. 1, the composite structure 12 may further comprise an inner channel charge 18b adjacent to the outer channel charge. 18a. Preferably, the outer channel charge 18a and the inner channel charge 18b comprise inner C-channel charge 19a and outer C-channel charge 19b, each having a respective C-shaped cross-section 23a, 23b. As further shown in FIG. 1, the outer channel charge 18a and the inner channel charge 18b each have a web portion 20, and a pair of oppositely facing flanges 22, 24. Each of the web portions 20 (see FIG. 1) transitions to one of the flanges 22, 24 (see FIG. 1) at an inner radius 26 (see FIG. 1) and at an outer radius 27 (see FIG. 1). The web portions 20 (see FIG. 1) are joined together to form a web 21 (see FIG. 1).

Figure 11:
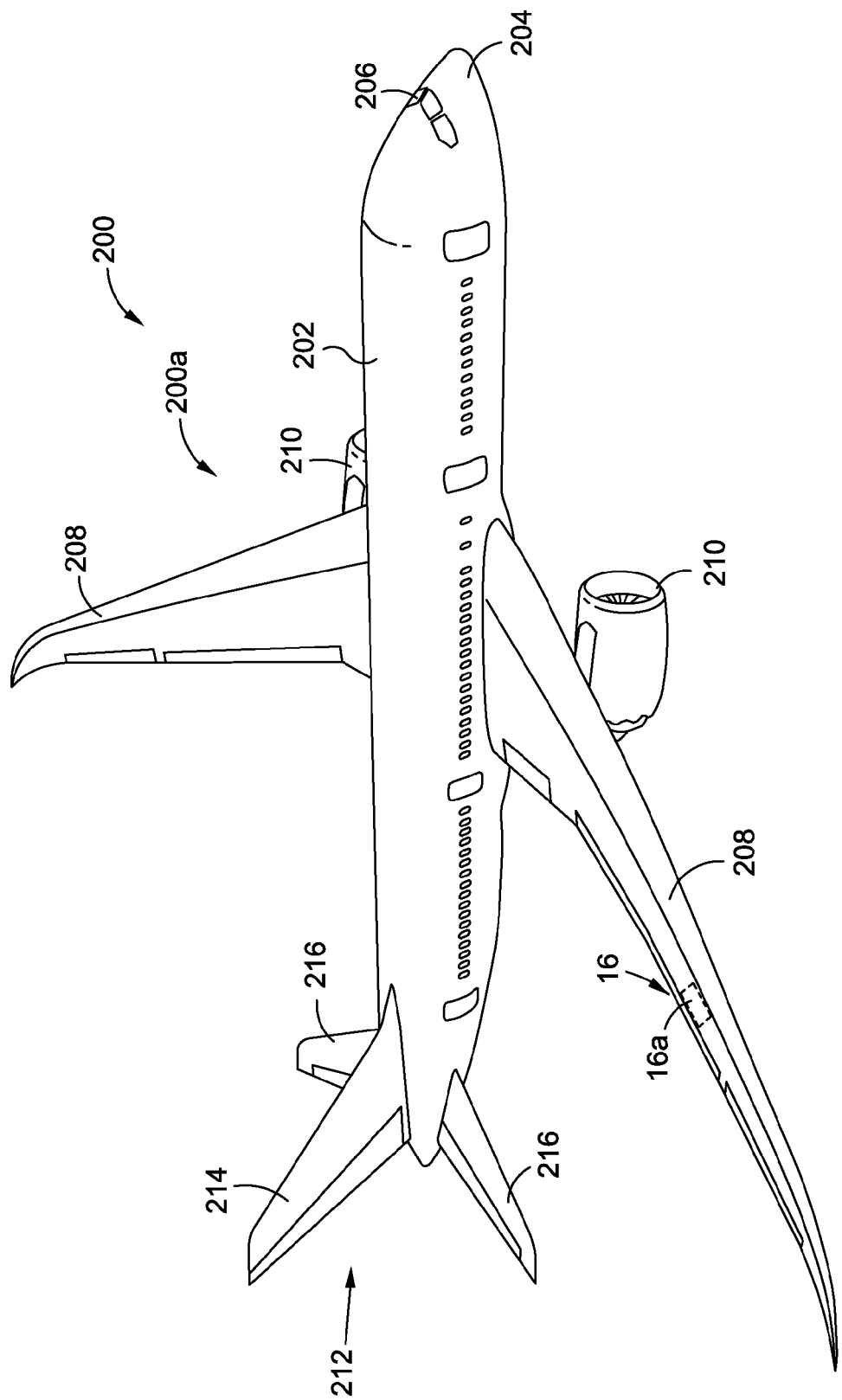
FIG. 11 is an illustration of a perspective view of an aircraft that may incorporate an exemplary composite structure having a reduced area radius filler that may be formed with an embodiment of a method of the disclosure.

The composite stiffener 14 (see FIG. 1) may be used to stiffen a structural member 16 (see FIG. 1), such as a wing skin panel 16a (see FIG. 1), of a wing 208 (see FIG. 11) of an air vehicle 200 (see FIG. 11), such as an aircraft 200a (see FIG. 11). The composite stiffener 14 (see FIG. 1) may also be used to stiffen a wing stringer or other component of the wing 208 (see FIG. 11) or a skin panel of a fuselage 202 (see FIG. 11) section of the aircraft 200a (see FIG. 11).

As further shown in FIG. 1, a cap 28 is joined to outer surfaces 30 of the flanges 22, and a base charge 32 is joined to outer surfaces 34 of the flanges 24. The cap 28 (see FIG. 1) is bonded to the structural member 16 (see FIG. 1), such as wing skin panel 16a (see FIG. 1), in the form of an upper wing skin panel, at an interface 35a (see FIG. 1). The base charge 32 (see FIG. 1) is bonded to the structural member 16 (see FIG. 1), such as wing skin panel 16a (see FIG. 1), in the form of a lower wing skin panel, at an interface 35b (see FIG. 1).

As further shown in FIG. 1, a radius filler region 36 having a generally triangular shape 38 is shown at each intersection of the radii 26 with the cap 28 and the base charge 32. The reduced area radius filler 10 (see FIG. 1) comprises a radius filler 11 (see FIG. 1), also referred to interchangeably herein as a "noodle". Each radius filler region 36 (see FIG. 1) is filled with the radius filler 11 or noodle. The radius filler 11 has a radius 40 and cross-sectional shape that substantially corresponds to a generally triangular cross-section 42 of the radius filler region 36.

Figure 2:
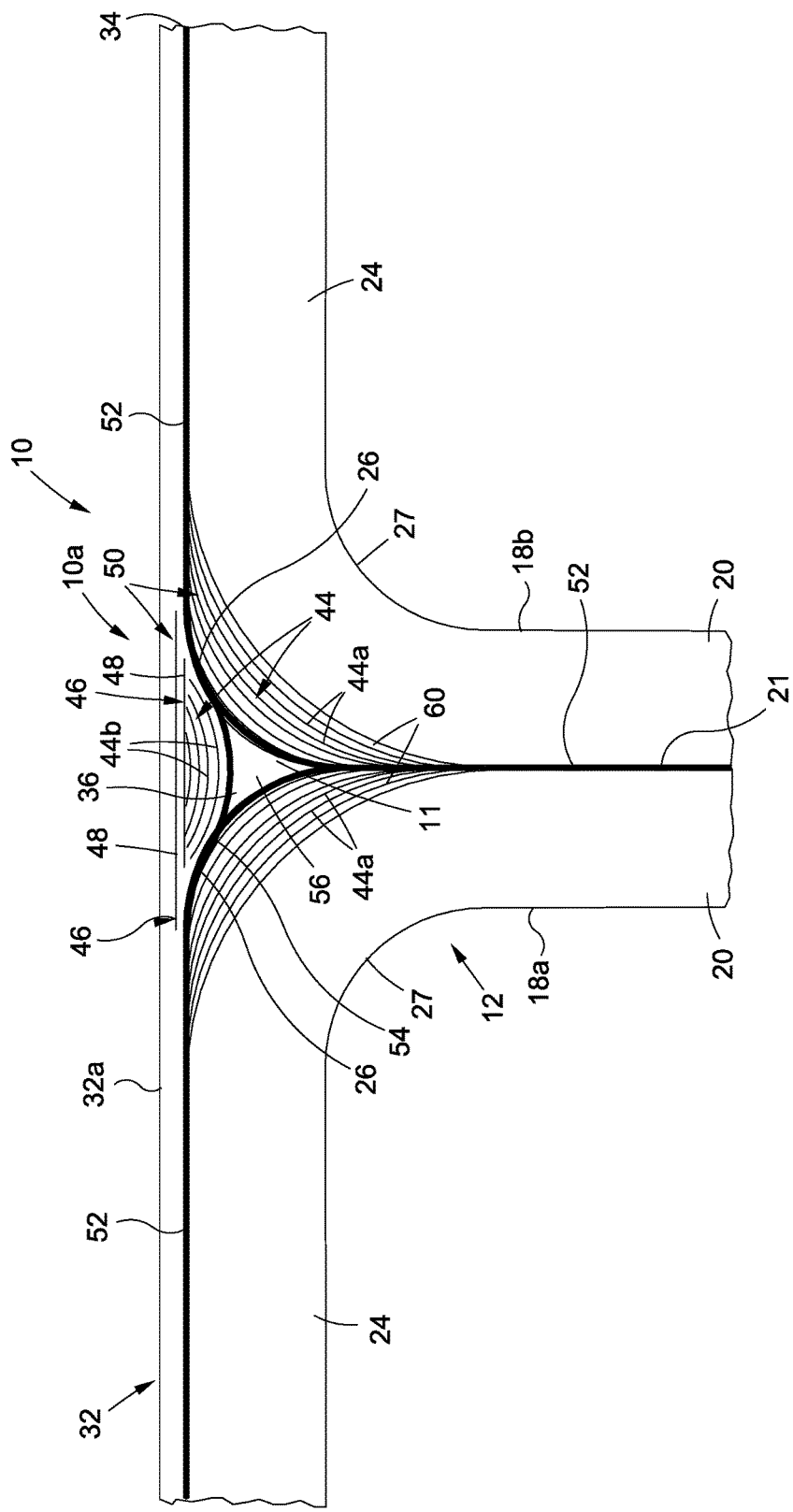
FIG. 2 is an illustration of a front partial sectional view of an embodiment of a reduced area radius filler having a full ply fabric and adhesive inner wrap and that may be used in a composite structure formed with an embodiment of a method of the disclosure.

FIG. 2 is an illustration of a front partial sectional view of an embodiment of a reduced area radius filler 10, such as in the form of reduced area radius filler 10a, having a full ply fabric and adhesive inner wrap 52, and that may be used in the composite structure 12 (see FIG. 1) formed with an embodiment of the method 150 (see FIG. 10) of the disclosure.

FIG. 2 shows the outer channel charge 18a and the inner channel charge 18b with the web portions 20 forming the web 21 and transitioning to the flanges 24 at the inner radius 26 and at the outer radius 27. FIG. 2 further shows the base charge 32 and the radius filler 11 in the radius filler region 36. Known construction processes may create an inner radius 26 (see FIG. 2) larger than the outer radius 27 (see FIG. 2), whereas the embodiment shown in FIG. 2 may create an inner radius 26 equal to or smaller than the outer radius.

As shown in FIG. 2, in this embodiment, the reduced area radius filler 10, such as in the form of reduced area radius filler 10a, comprises radius filler charges 44 comprised of a charge of plies 60, a reduced base charge 32a, and a full ply fabric and adhesive inner wrap 52. The radius filler charges 44 (see FIG. 2) may comprise radial side local material 44a (see FIG. 2) positioned along each side of radii 26 (see FIG. 2) of the radius filler 11 (see FIG. 2), and may further comprise base side local material 44b (see FIG. 2) positioned along a base side of the radius filler 11 (see FIG. 2).

Each ply 60 or charge of plies 60 may comprise continuous plies either individually interspersed or stacked composite plies, such as in a form comprising a prepreg unidirectional tape, a unidirectional fiber tape, a carbon fiber-reinforced plastic (CFRP) tape, a carbon fiber-reinforced plastic (CFRP) fabric, a prepreg fabric, a woven fabric including a woven carbon fiber fabric, a combination thereof, or another suitable composite material. In addition, materials such as glass fabric reinforced plastic (GFRP) or metallic pieces, such as of titanium, aluminum, steel or another suitable metal may be used.

The reduced base charge 32a (see FIG. 2) may comprise base filler charges 46 (see FIG. 2) comprising base charge local composite plies 48 positioned along the interface of the base charge 32 and the base side local material 44b (see FIG. 2) along the base side of the radius filler 11 (see FIG. 2). The charge of plies 60 (see FIG. 2) in the base charge 32 adjacent to the outer channel charge 18a (see FIG. 2) further reduces the inner radius 26 (see FIG. 2).

The position of the radius filler 11 (see FIG. 2) or noodle may preferably be controlled by a thickness of the base filler charges 46 (see FIG. 2) versus a thickness of the radius filler charges 44 (see FIG. 2). The radius filler charges 44 (see FIG. 2) may have a quasi-layup with a full ply fabric, which provides a high toughness.

As shown in FIG. 2, preferably the reduced area radius filler 10, such as in the form of reduced area radius filler 10a, comprises an interleaved ply configuration 50. The full ply fabric and adhesive inner wrap 52 (see FIG. 2) is preferably applied with an adhesive layer 54 (see FIG. 2) to the outer surfaces 34 (see FIG. 2) of the flanges 24 (see FIG. 2) between the flanges 24 (see FIG. 2) and the base charge 32 (see FIG. 2), at web 21 (see FIG. 2) between the web portions 20 (see FIG. 2) of the outer channel charge 18a (see FIG. 2) and the inner channel charge 18b (see FIG. 2), and around the radius filler 11 (see FIG. 2) or noodle. The fabric and adhesive inner wrap 52 (see FIG. 2) may be applied between the base charge 32 (see FIG. 2) and the outer channel charge 18a (see FIG. 2) and applied adjacent to the inner radius 26 (see FIG. 2) to further reduce the inner radius 26 (see FIG. 2).

The radius filler 11 (see FIG. 2) or noodle may comprise a uni-noodle, a laminate noodle, a rolled fiberglass fabric noodle, a titanium extruded noodle, or another suitable noodle. The radius filler 11 (see FIG. 2) or noodle is preferably positioned at a center interface portion 56 (see FIG. 2) surrounded by the radius filler charges 44 (see FIG. 2) and the full ply fabric and adhesive inner wrap 52 (see FIG. 2).

Figure 3:
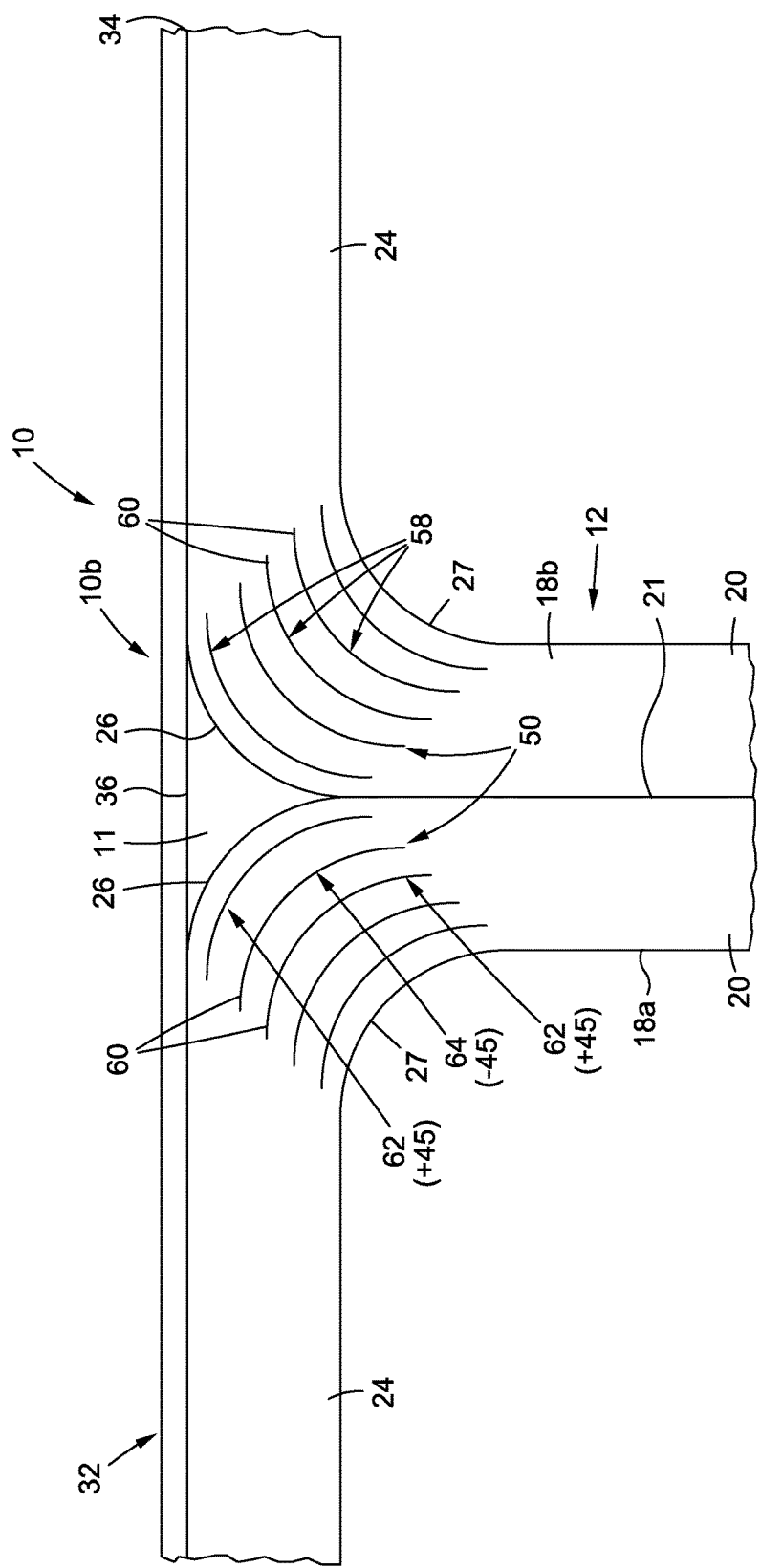
FIG. 3 is an illustration of a front partial sectional view of an embodiment of a reduced area radius filler having interlaminar fillers interspersed in a radius of the reduced area radius filler and that may be used in a composite structure formed with an embodiment of a method of the disclosure.

FIG. 3 is an illustration of a front partial sectional view of an embodiment of a reduced area radius filler 10, such as in the form of reduced area radius filler 10b, having interlaminar fillers 58 of individual plies 60 interspersed in the radius 26 of the reduced area radius filler 10, such as in the form of reduced area radius filler 10b, and that may be used in the composite structure 12 (see FIG. 1) formed with an embodiment of the method 150 (see FIG. 10) of the disclosure.

FIG. 3 shows the outer channel charge 18a and the inner channel charge 18b with the web portions 20 joining at web 21 and transitioning to the flanges 24 at the inner radius 26 and at the outer radius 27. FIG. 3 further shows the base charge 32 and the radius filler 11 in the radius filler region 36. As shown in FIG. 3, in this embodiment, the reduced area radius filler 10, such as in the form of reduced area radius filler 10b, comprises interlaminar fillers 58 comprising individual plies 60 having either a +45 degree ply orientation 62 or a −45 degree ply orientation 64. As shown in FIG. 3, preferably the reduced area radius filler 10, such as in the form of reduced area radius filler 10a, comprises an interleaved ply configuration 50.

Figure 4:
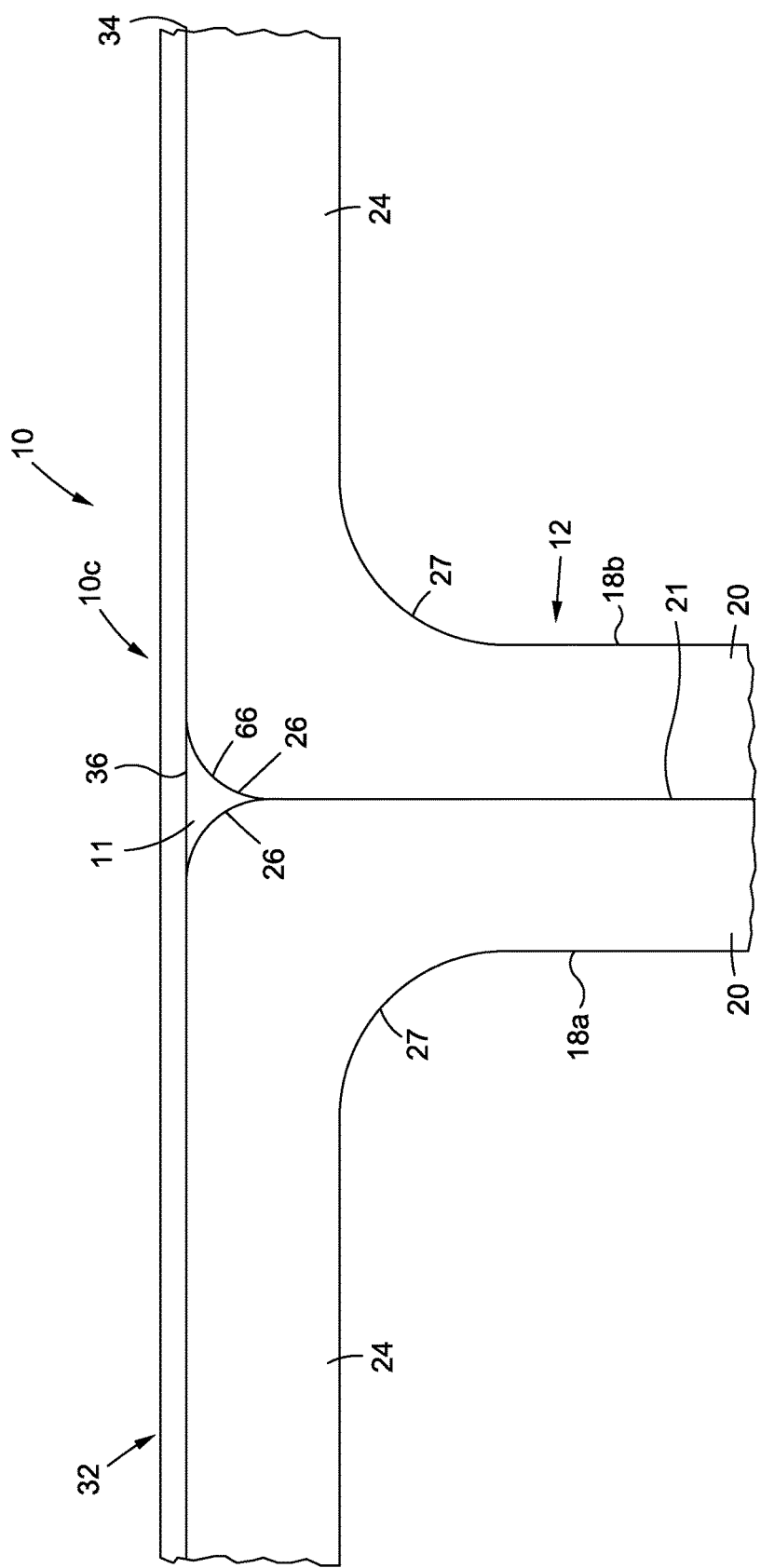
FIG. 4 is an illustration of a front partial sectional view of an embodiment of a reduced area radius filler having a reduced volume of an extruded radius filler and that may be used in a composite structure formed with an embodiment of a method of the disclosure.

FIG. 4 is an illustration of a front partial sectional view of an embodiment of a reduced area radius filler 10, such as in the form of reduced area radius filler 10c, having a reduced volume extruded radius filler 66, and that may be used in a composite structure 12 (see FIG. 1) formed with an embodiment of the method 150 (see FIG. 11) of the disclosure.

FIG. 4 shows the outer channel charge 18a and the inner channel charge 18b each with the web portions 20 joining at web 21 and transitioning to the flanges 24 at the inner radius 26 and at the outer radius 27. FIG. 4 further shows the base charge 32 and the radius filler 11 in the radius filler region 36. The inner radius 26 (see FIG. 4) may have a radial measurement that is smaller in dimension than the outer radius 27 (see FIG. 2). As shown in FIG. 4, in this embodiment, the volume of the extruded radius filler 11 or noodle is significantly reduced and approaches the embodiment of a no radius filler or noodle embodiment, discussed below in connection with FIG. 7.

Figure 5:
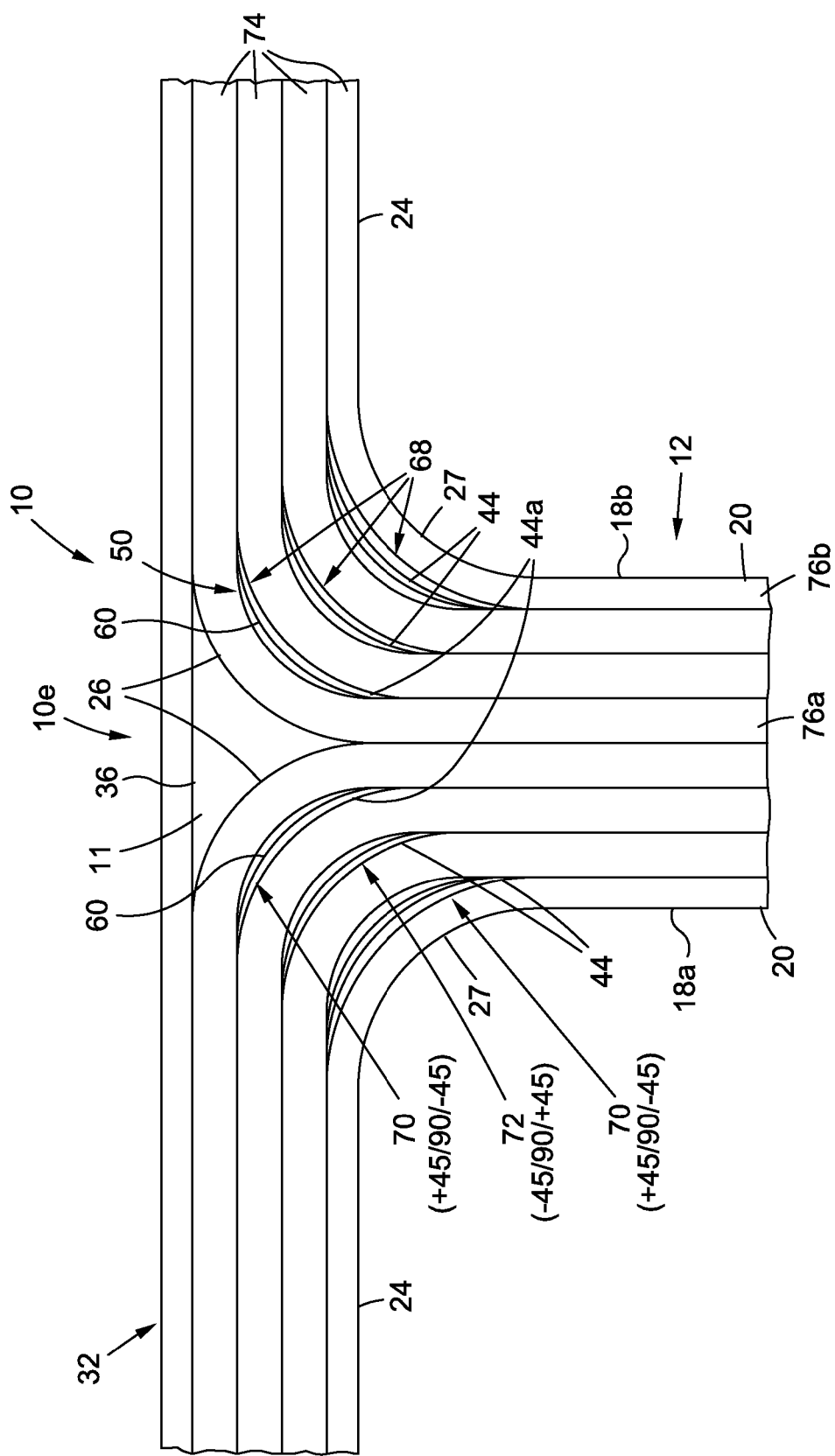
FIG. 5 is an illustration of a front partial sectional view of an embodiment of a reduced area radius filler having multiple pockets of radius filler charges and that may be used in a composite structure formed with an embodiment of a method of the disclosure.

FIG. 5 is an illustration of a front partial sectional view of an embodiment of a reduced area radius filler 10, such as in the form of reduced area radius filler 10d, having multiple pockets 68 of radius filler charges 44, and that may be used in the composite structure 12 (see FIG. 1) formed with an embodiment of the method 150 (see FIG. 10) of the disclosure.

FIG. 5 shows the outer channel charge 18a and the inner channel charge 18b with the web portions 20 joining at web 21 and transitioning to the flanges 24 at the inner radius 26 and at the outer radius 27. FIG. 5 further shows the base charge 32 and the radius filler 11 in the radius filler region 36.

As shown in FIG. 5, in this embodiment, the reduced area radius filler 10, such as in the form of reduced area radius filler 10d, comprises the multiple pockets 68 of radius filler charges 44 comprising a charge of plies 60 of radial side local material 44a having either a (+45/90/−45) degree ply orientation 70 or a (−45/901+45) degree ply orientation 72. In this embodiment, the outer channel charge 18a and the inner channel charge 18b comprise interlaminar layers 74, where each of the outer channel charge 18a and the inner channel charge 18b has an inner channel charge 76a and an outer channel charge 76b. The multiple pockets 68 (see FIG. 5) of the charge of plies 60 (see FIG. 5) may be interleaved throughout or adjacent the inner radius 26 (see FIG. 5), to further reduce the inner radius 26 (see FIG. 5).

Figure 6:
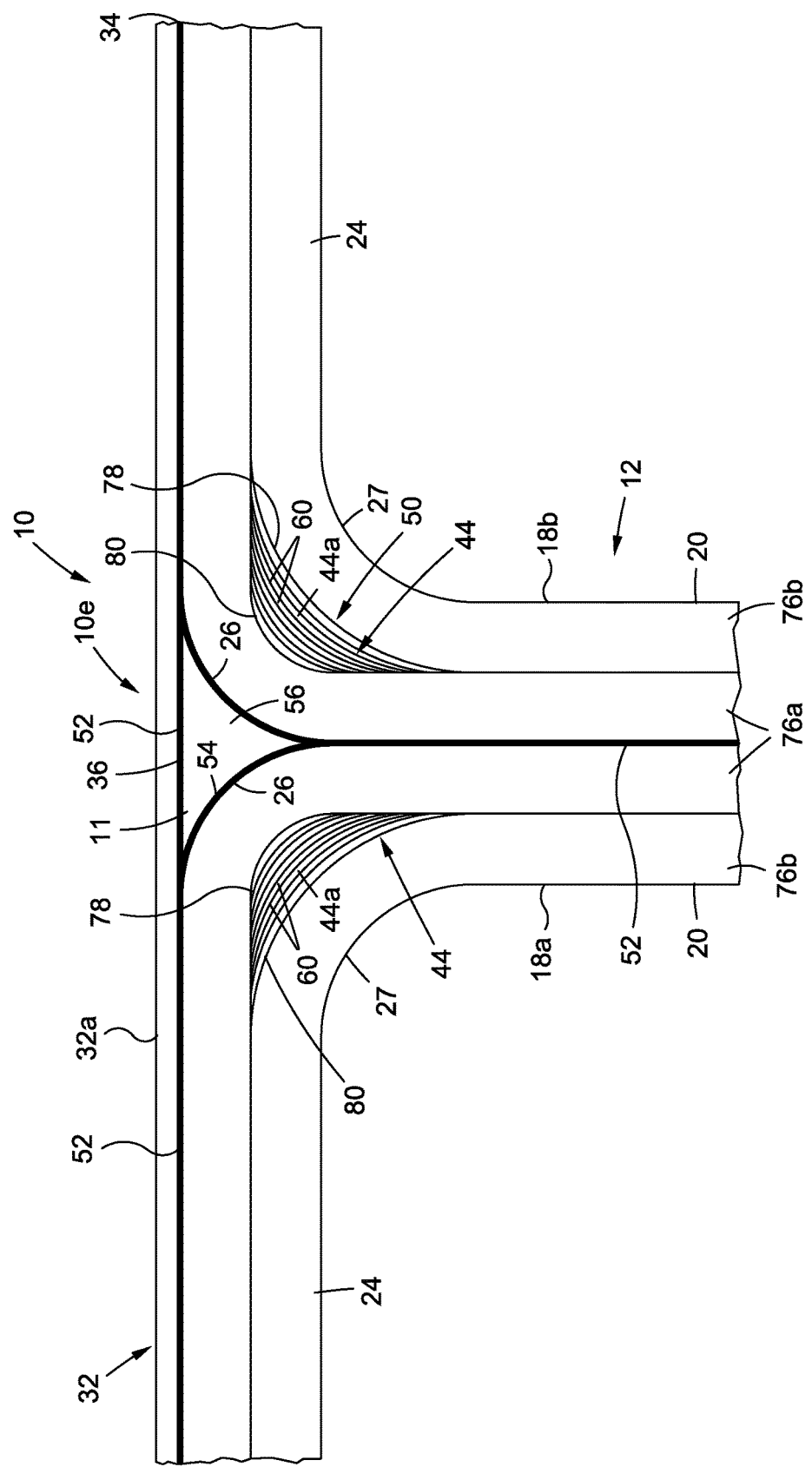
FIG. 6 is an illustration of a front partial sectional view of an embodiment of a reduced area radius filler having inner and outer channel charges, radius filler charges, and a full ply fabric and adhesive inner wrap, and that may be used in a composite structure formed with an embodiment of a method of the disclosure.

FIG. 6 is an illustration of a front partial sectional view of an embodiment of a reduced area radius filler 10, such as in the form of reduced area radius filler 10e, having inner channel charges 76a and outer channel charges 76b, radius filler charges 44, and a full ply fabric and adhesive inner wrap 52, and that may be used in the composite structure 12 (see FIG. 1) formed with an embodiment of the method 150 (see FIG. 10) of the disclosure.

FIG. 6 shows the outer channel charge 18a and the inner channel charge 18b with the web portions 20 transitioning to the flanges 24 at the inner radius 26 and at the outer radius 27. FIG. 6 further shows the base charge 32, such as in the form of reduced base charge 32a, and the radius filler 11 in the radius filler region 36. The inner radius 26 (see FIG. 6) may have a radial measurement equal to or smaller than the outer radius 27 (see FIG. 6). One embodiment may consist of radial side local material 44a (see FIGS. 2, 6) and base side local material 44b (see FIG. 2) consisting of various composite materials, such as carbon-fiber reinforced plastic (CFRP) or glass fabric reinforced plastic (GFRP), or metallic pieces, such as of titanium, aluminum, steel, or another suitable metal.

As shown in FIG. 6, in this embodiment, the reduced area radius filler 10, such as in the form of reduced area radius filler 10e, comprises radius filler charges 44, a reduced base charge 32a, and a full ply fabric and adhesive inner wrap 52. The radius filler charges 44 (see FIG. 6) may comprise radial side local material 44a (see FIG. 6) positioned in the radius 26 (see FIG. 6) of the radius filler 11 (see FIG. 6). The radius filler charges 44 (see FIG. 6) may have a quasi-layup with minimal 0's (zero degree plies), for example, 10 plies.

In this embodiment, the outer channel charge 18a and the inner channel charge 18b (see FIG. 6) each comprise an inner channel charge 76a (see FIG. 6) of about 15 plies, and an outer channel charge 76b (see FIG. 6) of about 15 plies. The radial side local material 44a (see FIG. 6) positioned of the radius filler charges 44 (see FIG. 6) may comprise short plies 78 (see FIG. 6) and long plies 80 (see FIG. 6). The radial side local material 44a (see FIG. 6) may be interspersed from short plies 78 (see FIG. 6) to long plies 80 (see FIG. 6) or from long plies 80 (see FIG. 6) to short plies 78 (see FIG. 6).

Figure 7:
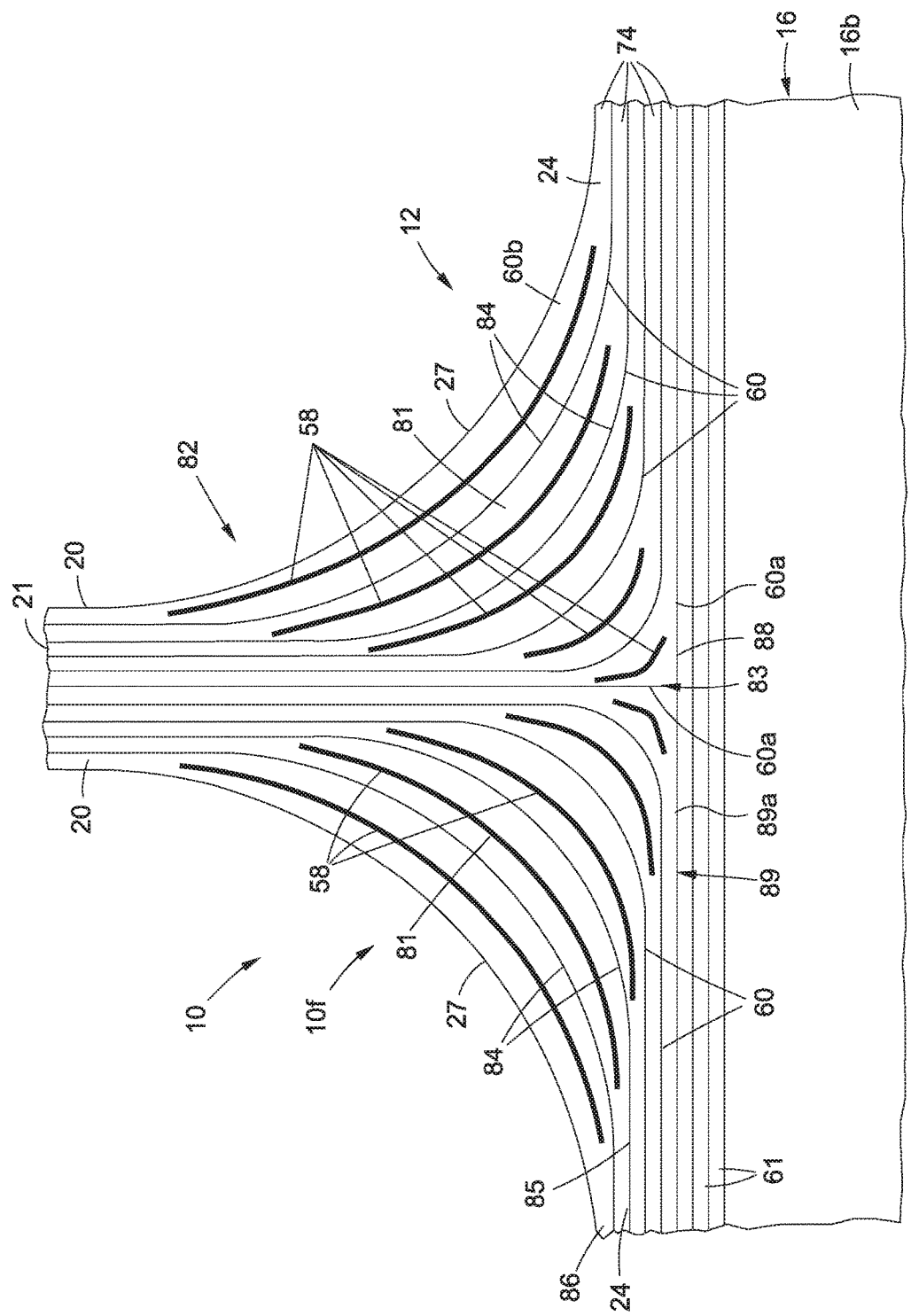
FIG. 7 is an illustration of a front partial sectional view of another embodiment of a reduced area radius filler having interlaminar fillers interspersed in a radius of the reduced area radius filler and that may be used in a composite structure formed with an embodiment of a method of the disclosure.

FIG. 7 is an illustration of a front partial sectional view of another embodiment of a reduced area radius filler 10, such as in the form of reduced area radius filler 10f, having interlaminar filler segments 58 comprised of individual plies 60 interspersed in areas 81 (see FIG. 7) between radii 27 (see FIG. 7). The reduced area radius filler 10f (see FIG. 7) may be used in the composite structure 12 (see FIG. 1) formed with an embodiment of the method 150 (see FIG. 10) of the disclosure. FIG. 7 shows the web 21, the flanges 24, the outer radius 27, the interlaminar layers 74, the structural member 16 such as in the form of a stringer charge or skin 16b, and individual plies 60.

In this embodiment, the reduced area radius filler 10, such as in the form of reduced area radius filler 10f, preferably comprises a segmented interlaminate radius filler (SIRF) 82 that has no radius filler 11 (see FIG. 1) or noodle. The segmented interlaminate radius filler (SIRF) 82 (see FIG. 7) divides a vertical pull-off load between several interlaminar layers 74 (see FIG. 7) and between individual plies 60 (see FIG. 7) at a T-section radius 83 (see FIG. 7). The innermost ply 60a (see FIG. 7) forms the T-section radius 83 (see FIG. 7), and subsequent interlaminar layers 74 (see FIG. 7) gradually form larger and larger radii 84 (see FIG. 7) by using the interlaminar filler segments 58 to create a void 85 at a vertex 86 of the corners of the SIRF 82 (see FIG. 7).

The SIRF 82 (see FIG. 7) is preferably configured to place interlaminar filler segments 58 between the charge of plies 60 (see FIG. 7) to space the charge of plies 60 (see FIG. 7) away from each other to create a T-section radius 83 (see FIG. 7). The interlaminar filler segments 58 (see FIG. 7) preferably comprise chopped fibers, tape plies including unidirectional tape, fabric plies, fiberglass, continuous plies, metallic pieces, a combination thereof, or any other suitable material that sufficiently bonds to the surrounding structural member 16 (see FIG. 7), such as stringer plies 61 (see FIG. 7) of a stringer charge or skin 16b (see FIG. 7).

The SIRF 82 (see FIG. 7) preferably uses short strips of the interlaminar filler segments 58 (see FIG. 7) in order to transition from a square corner 87 (see FIG. 7) of the innermost ply 60a (see FIG. 7) to a satisfactory radius 27 at the outermost ply 60b (see FIG. 7). The interlaminar filler segments 58 (see FIG. 7) preferably spaces the individual plies 60 (see FIG. 7) away from each other creating an appropriate T-section radius 83 (see FIG. 7). The small, short sections of interlaminar filler segments 58 (see FIG. 7) create a smooth CTE (coefficient of thermal expansion) interchange between the outermost plies 60b (see FIG. 7) and the short sections of interlaminar filler segments 58 (see FIG. 7). The thin nature of the interlaminar filler segments 58 (see FIG. 7) do not create resin rich pockets, and the pull-off load is allowed to be spread more evenly into the stringer charge or skin 16b (see FIG. 7) by spreading a stringer charge interface 89 (see FIG. 7) into a larger area than previous designs.

The interlaminar filler segments 58 (see FIG. 7) may be applied between every stringer tape ply in the stringer charge or skin 16b (see FIG. 7), but it may also be applied between multiple stringer plies 61 in the stringer charge or skin 16b (see FIG. 7), if necessary. The SIRF 82 (see FIG. 7) preferably splits the load out across a larger area by splitting up the stringer plies 61 by using several small interlaminar filler segments 58 (see FIG. 7) to achieve this effect. Previous designs used one large radius filler which tended to crack because of the large CTE differences between the large radius filler and the surrounding laminate, whereas the SIRF 82 (see FIG. 7) uses small interlaminar filler segments 58 (see FIG. 7) to minimize the difference in CTE. The stringer charge interface 89 (see FIG. 7), such as in the form of a bond line 89a between the stringer charge or skin 16b and the reduced area radius filler 10f (see FIG. 7), is also not as critical in the SIRF 82 (see FIG. 7), since several less critical bond lines may be used in place of one bond line used with such known radius filler.

The SIRF 82 (see FIG. 7) distributes the load more evenly into the stringer charge or skin 16b (see FIG. 7), reduces the CTE mismatch between the stringer charge or skin 16b (see FIG. 7) and the radius filler 11 (see FIG. 1) or noodle, and may reduce the importance of the single stringer to noodle bond line 89a used for known radius fillers or noodles by using several less critical bond lines.

FIG. 8A is an illustration of a schematic diagram of an embodiment of a radius filler fabrication process 90, such as in the form of radius filler fabrication process 90a, that may be used in forming the reduced area radius filler 10 (see FIGS. 1-7) of the composite structure 12 (see FIG. 1) by laying up with a mandrel 96. FIG. 8B is an illustration of a schematic diagram of another embodiment of a radius filler fabrication process 90, such as in the form of radius filler fabrication process 90b, that may be used in forming the reduced area radius filler 10 (see FIGS. 1-7) of the composite structure 12 (see FIG. 1) by laying up with a radius filler 11 or noodle.

As shown in FIGS. 8A-8B, a composite laminate stackup 92 is stacked on a forming tool 100 and the composite laminate stackup 92 is deformed when a downward force 98 is applied to the composite laminate stackup 92, and deformed plies 94 are formed with shorter plies 94a above an ultrasonic knife cut 102 and longer plies 94b below the ultrasonic knife cut 102. The deformed plies 94 may be laid up on the mandrel (see FIG. 8A) or may be laid up to form a radius filler 11 or noodle (see FIG. 8B).

FIG. 9A is a back perspective view of a wing 208 of an aircraft 200a (see FIG. 11) that incorporates a structural member 16, such as an upper trailing edge panel 16c, on the wing 208. The upper trailing edge panel 16c (see FIG. 9A) may have a reduced area radius filler 10, such as in the form of reduced area radius filler 10g.

FIG. 9B is an enlarged top view of the structural member 16, such as upper trailing edge panel 16c of FIG. 9A. As shown in FIG. 9A, the upper trailing edge panel 16c comprises an inner skin 106, an outer skin 108, a core 110, and an edge band 112. A ply sequence 104 for the upper trailing edge panel 16c is also shown in FIG. 9B.

FIG. 9C is a cross-sectional view of a core ramp down 114 of the upper trailing edge panel 16c taken along lines 9C-9C of FIG. 9B. The core ramp down 114 of the upper trailing edge panel 16c of FIG. 9C shows the inner skin 106, the outer skin 108, the core 110 such as a honeycomb core 110a, the edge band 112, and a core ramp down 114 having a top end 116 and a bottom end 118. With core ramp downs, a large peel load may occur at the bottom 118 of the core ramp down 114, and reinforcing filler material 120 may be integrated in corners 122 of interlaminar layers 124 of the core ramp down 114 in order to reinforce the core ramp down 114.

Figure 10:
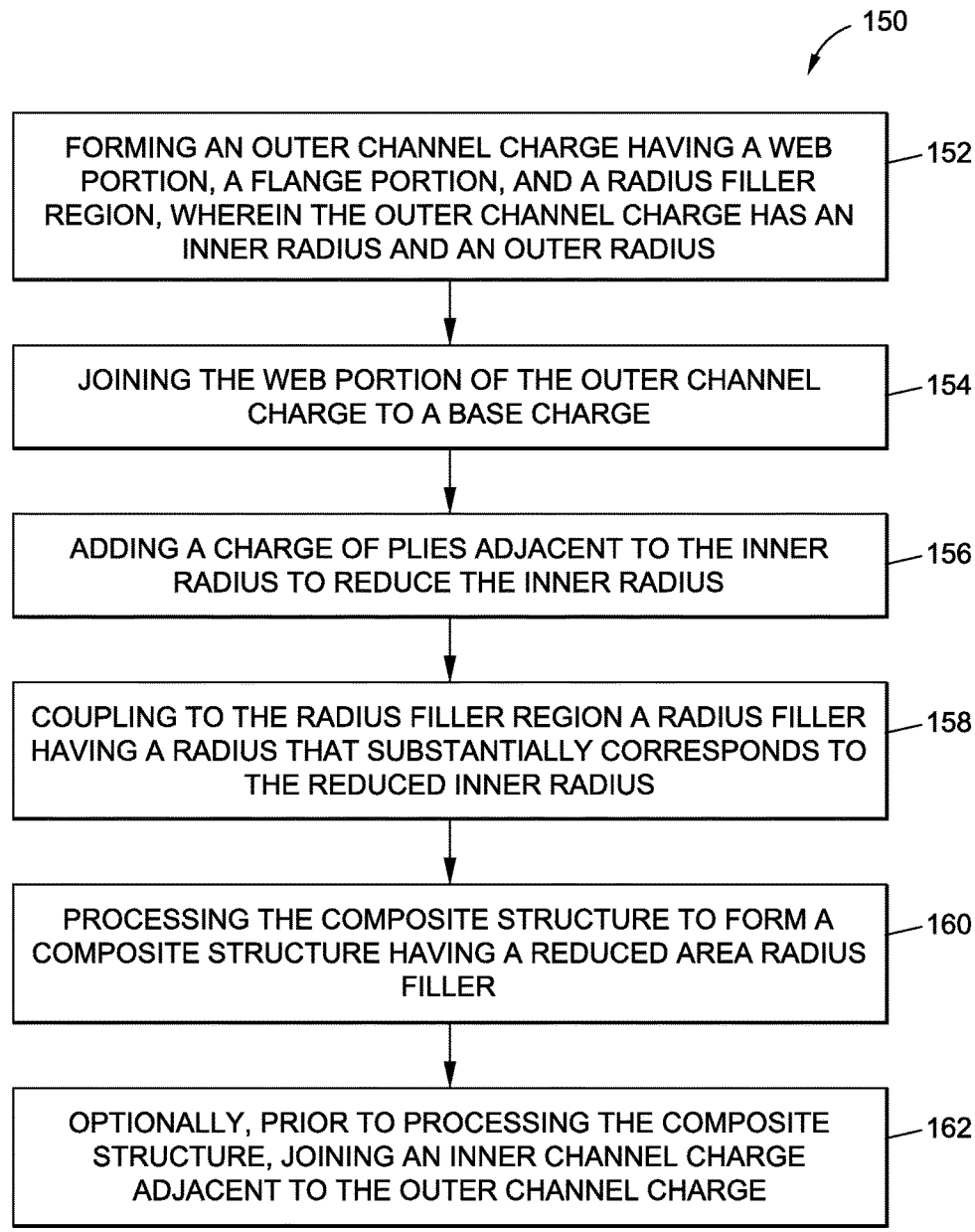
FIG. 10 is an illustration of a flow diagram of an embodiment of a method of the disclosure.

FIG. 10 is an illustration of a flow diagram of an embodiment of a method 150 of the disclosure. As shown in FIG. 10, there is provided the method 150 for forming the composite structure 12 (see FIG. 1) having a reduced area radius filler 10 (see FIGS. 1-7).

As shown in FIG. 10, the method 150 comprises step 152 of forming an outer channel charge 18a (see FIG. 1) having a web portion 20 (see FIG. 1), flange portions 22, 24 (see FIG. 1), and a radius filler region 36 (see FIG. 1), wherein the outer channel charge 18a (see FIG. 1) has in inner radius 26 (see FIG. 1) and an outer radius 27 (see FIG. 1).

As further shown in FIG. 10, the method 150 further comprises step 154 of joining the web portion 20 (see FIG. 1) of the outer channel charge 18a (see FIG. 1) to a base charge 32 (see FIG. 1).

As shown in FIG. 10, the method 150 further comprises step 156 of adding a charge of plies 60 (see FIG. 6) adjacent to the inner radius 26 (see FIG. 6) to reduce the inner radius 26 (see FIG. 6). The step 156 of adding the charge of plies 60 (see FIG. 6) adjacent to the inner radius 26 (see FIG. 6) to reduce the inner radius 26 (see FIG. 6) comprises interleaving multiple pockets 68 (see FIG. 5) of ply charges 60 (see FIG. 5) throughout or adjacent the inner radius 26 (see FIG. 5), that further reduce the inner radius 26 (see FIG. 5).

As shown in FIG. 10, the method 150 further comprises step 158 of coupling to the radius filler region 36 (see FIG. 1) a radius filler 11 (see FIG. 1) having a radius 40 (see FIG. 1) that substantially corresponds to the reduced inner radius 26 (see FIG. 1).

As shown in FIG. 10, the method 150 further comprises step 160 of processing the composite structure 12 (see FIG. 1) to form a composite structure 12 (see FIG. 1) having the reduced area radius filler 10 (see FIG. 1). Known forming processes such as a hot drape forming process, a pultrusion forming process, or another suitable forming process may be used.

As further shown in FIG. 10, the method 150 may optionally comprise prior to step 160 of processing the composite structure 12 (see FIG. 1), the optional step 162 of joining an inner channel charge 18b (see FIG. 1) adjacent to the outer channel charge 18a (see FIG. 1).

The method 150 may further comprise using a segmented interlaminate radius filler 82 (see FIG. 7) configured to place interlaminar filler segments 58 (see FIG. 7) between the charge of plies 60 (see FIG. 7) to space the charge of plies 60 (see FIG. 7) away from each other to create a T-section radius 83 (see FIG. 7).

The method 150 may further comprise the step prior to step 160 (see FIG. 10) of processing the composite structure 12 (see FIG. 1), the step of adding a charge of plies 60 (see FIG. 2) in the base charge 32 (see FIG. 2) adjacent to the outer channel charge 18a (see FIG. 2) that further reduce the inner radius 26 (see FIG. 2).

The method 150 may further comprise the step prior to step 160 of processing the composite structure 12 (see FIG. 1), the step of applying a fabric and adhesive inner wrap 52 (see FIG. 2) between the base charge 32 (see FIG. 2) and the outer channel charge 18*a* (see FIG. 2), and applying adjacent to the inner radius 26 (see FIG. 2) to further reduce the inner radius 26 (see FIG. 2).

In another embodiment of the disclosure, there is provided an aircraft 200*a* (see FIG. 11). The aircraft 200*a* (see FIG. 11) comprises a fuselage 202 (see FIG. 11) and at least one wing 208 (see FIG. 11) coupled to the fuselage 202. The at least one wing 208 has a composite structure 12 (see FIG. 1). The composite structure 12 (see FIG. 1) comprises a base charge 32 (see FIG. 1) and an outer channel charge 18*a* (see FIG. 1), wherein the outer channel charge 18*a* (see FIG. 1) has an inner radius 26 (see FIG. 1) and an outer radius 27 (see FIG. 1). The composite structure 12 (see FIG. 1) further comprises a charge of plies 60 (see FIG. 1) adjacent to the inner radius 26 (see FIG. 1) that reduce the inner radius 26 (see FIG. 1).

The composite structure 12 (see FIG. 1) of the aircraft 200*a* (see FIG. 11) may further comprise an inner channel charge 18*b* (see FIG. 1) adjacent to the outer channel charge 18*a* (see FIG. 1). The composite structure 12 (see FIG. 1) of the aircraft 200*a* (see FIG. 11) may further comprise a segmented interlaminate radius filler 82 (see FIG. 7) configured to place interlaminar filler segments 58 (see FIG. 7) between the charge of plies 60 (see FIG. 7) to space the charge of plies 60 away from each other to create a T-section radius 83 (see FIG. 7).

The composite structure 12 (see FIG. 1) of the aircraft 200*a* (see FIG. 11) may further comprise a charge of plies 60 (see FIG. 2) in the base charge 32 (see FIG. 2) adjacent to the outer channel charge 18*a* (see FIG. 2) that further reduce the inner radius 26 (see FIG. 2). The composite structure 12 (see FIG. 1) of the aircraft 200*a* (see FIG. 11) may further comprise multiple pockets 68 (see FIG. 5) of a charge of plies 60 (see FIG. 5) interleaved throughout or adjacent the inner radius 26 (see FIG. 5), that further reduce the inner radius 26 (see FIG. 5).

FIG. 11 is an illustration of a perspective view of an air vehicle 200, such as an aircraft 200*a*, that may incorporate an exemplary structural member 16, such as a wing skin panel 16*a*, having a composite structure 12 (see FIG. 1) having a reduced area radius filler 10 (see FIGS. 2-7) that may be formed with an embodiment of the method 150 (see FIG. 10) of the disclosure. As shown in FIG. 11, the air vehicle 200, such as in the form of aircraft 200*a*, comprises a fuselage 202, a nose 204, a cockpit 206, wings 208, one or more propulsion units 210, a tail 212 comprising a vertical tail portion 214, and horizontal tail portions 216.

As shown in FIG. 1, the structural member 16 may comprise wing skin panels 16*a* in wings 18. Although the aircraft 200*a* shown in FIG. 11 is generally representative of a commercial passenger aircraft having one or more structural member 16, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more structural members 16 with reduced area radius fillers 10 and that may be made with one or more embodiments of the method 150 (see FIG. 10) disclosed herein.

Figure 12:
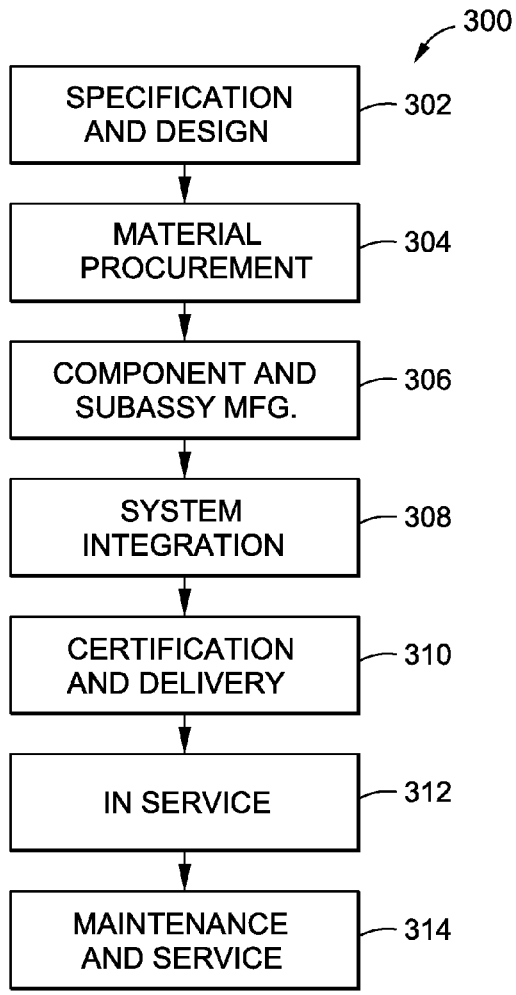
FIG. 12 is an illustration of a flow diagram of an aircraft production and service method; and, FIG. 13 is an illustration of a functional block diagram of an aircraft.
Figure 13:
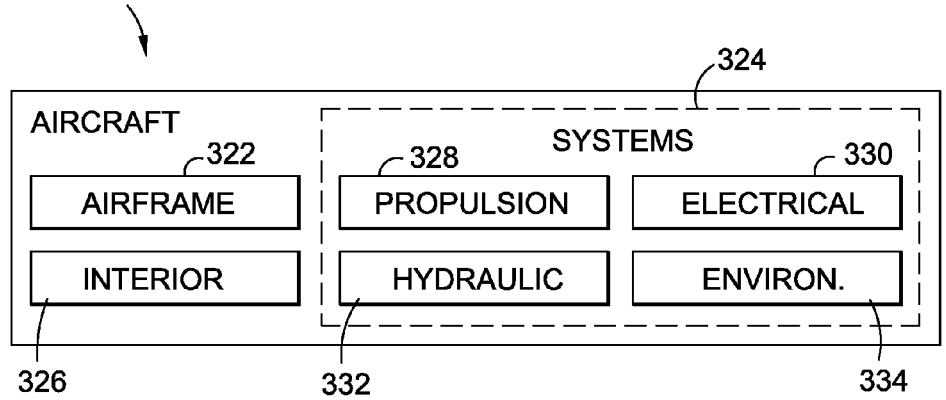

FIG. 12 is an illustration of a flow diagram of an aircraft production and service method 300. FIG. 13 is an illustration of a functional block diagram of an aircraft 320. Referring to FIGS. 12-13, embodiments of the disclosure may be described in the context of the aircraft manufacturing and service method 300, as shown in FIG. 12, and the aircraft 320, as shown in FIG. 13. During pre-production, the exemplary aircraft manufacturing and service method 300 (see FIG. 12) may include specification and design 302 (see FIG. 12) of the aircraft 316 (see FIG. 8) and material procurement 304 (see FIG. 12). During manufacturing, component and subassembly manufacturing 306 (see FIG. 12) and system integration 308 (see FIG. 12) of the aircraft 316 (see FIG. 13) takes place. Thereafter, the aircraft 316 (see FIG. 13) may go through certification and delivery 310 (see FIG. 12) in order to be placed in service 312 (see FIG. 12). While in service 312 (see FIG. 12) by a customer, the aircraft 316 (see FIG. 13) may be scheduled for routine maintenance and service 314 (see FIG. 12), which may also include modification, reconfiguration, refurbishment, and other suitable services.

Each of the processes of the aircraft manufacturing and service method 300 (see FIG. 12) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 8, the aircraft 320 produced by the exemplary aircraft manufacturing and service method 300 may include an airframe 322 with a plurality of systems 324 and an interior 326. As further shown in FIG. 8, examples of the systems 324 may include one or more of a propulsion system 328, an electrical system 330, a hydraulic system 332, and an environmental system 334. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300 (see FIG. 12). For example, components or subassemblies corresponding to component and subassembly manufacturing 306 (see FIG. 12) may be fabricated or manufactured in a manner similar to components or subassemblies produced while the aircraft 320 (see FIG. 13) is in service 312 (see FIG. 12). Also, one or more apparatus embodiments, method embodiments, or a combination thereof, may be utilized during component and subassembly manufacturing 306 (see FIG. 12) and system integration 308 (see FIG. 12), for example, by substantially expediting assembly of or reducing the cost of the aircraft 320 (see FIG. 13). Similarly, one or more of apparatus embodiments, method embodiments, or a combination thereof, may be utilized while the aircraft 320 (see FIG. 8) is in service 312 (see FIG. 12), for example and without limitation, to maintenance and service 312 (see FIG. 12).

Disclosed embodiments of the reduced area radius filler 10 (see FIGS. 2-7) and the method 150 (see FIG. 10) provide for composite structures 12 (see FIG. 1) having reduced area radius fillers 10 and interlaminar layers 74 formed of interlaminar filler segments 58 (see FIG. 7). The novelty resides in the local composite plies 60 (see FIG. 2-3, 5-7) added to the multiple outer channel charges 18*a* (see FIG. 1) and base charges 32 (see FIG. 1) that results in a noodle cross sectional area that is divorced from the channel inner radius 26 (see FIG. 1) and web laminate thickness. Adding plies 60 (see FIGS. 2-3) reduces the outer radius 27 (see FIG. 1) making the radius filler 11 or noodle smaller. Interleaved plies 50 (see FIG. 2) between the outer channel charge 18*a* (see FIG. 1) and the inner channel charge 18*b* (see FIG. 1) to reduce the size of the required radius filler 11 or noodle.

In addition, disclosed embodiments of the reduced area radius filler 10 (see FIGS. 2-7) and the method 150 (see FIG. 10) provide for reduced airframe weight and cost associated with reduced reinforcement requirements, reduced cost of composite inspections, significant amounts of time during the assembly of each composite wing, each wing could save a significant amount of weight by reducing the number of fasteners through the skin and by eliminating the associated lightening strike protection for each of the removed fasteners. Moreover, the number of protrusions through the fuel cell may be reduced. Fewer holes may reduce future possibilities of fuel leakage. Long term composite wing durability may be greatly increased by the improved thermal properties of the SIRF noodle. This reduced area radius filler 10 (see FIGS. 1-7) may distribute the load more evenly into the skin charge, reduce the CTE mismatch between the stringer charge and the radius filler 11 or noodle, and will reduce the importance of the single stringer to noodle bond line used for known noodles by using several less critical bond lines.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A composite structure comprising:
   an outer channel charge and an inner channel charge, each having a vertical web portion transitioning to a horizontal flange, and each having an inner radius and an outer radius;
   a radius filler region formed at an intersection of the inner radii of the outer channel charge and the inner channel charge, the radius filler region having a generally triangular shape and filled with a radius filler;
   a base charge joined on one side to outer surfaces of the horizontal flanges of the outer channel charge and the inner channel charge, the base charge having a base side local material positioned along a length of a base side of the radius filler region and positioned outside of the radius filler region; and
   a charge of plies having a radial side local material positioned along each side of the inner radii of the outer channel charge and the inner channel charge, that reduce the inner radii,
   the outer channel charge and the inner channel charge, the radius filler region, the base charge, and the charge of plies, all forming the composite structure.

2. The structure of claim 1, wherein the charge of plies comprises continuous plies comprising one of, individually interspersed continuous plies and stacked composite continuous plies.

3. The structure of claim 1, further comprising a segmented interlaminate radius filler having interlaminar filler segments between the charge of plies to space the charge of plies away from each other to create a T-section radius.

4. The structure of claim 3, wherein the interlaminar filler segments comprise chopped fibers, tape plies including unidirectional tape, fabric plies, fiberglass, continuous plies, metallic pieces, or a combination of two or more of the chopped fibers, the tape plies including unidirectional tape, the fabric plies, the fiberglass, the continuous plies, and the metallic pieces.

5. The structure of claim 1, wherein the base charge comprises a reduced base charge further comprising base charge local composite plies positioned along an interface of the base charge and the base side local material.

6. The structure of claim 1, further comprising multiple pockets of ply charges interleaved throughout or adjacent the inner radii of the outer channel charge and the inner channel charge, that reduce the inner radii.

7. The structure of claim 1, further comprising a full ply fabric and adhesive inner wrap applied between the base charge and the outer channel charge, between the base charge and the inner channel charge, between the base charge and the base side of the radius filler region, and applied adjacent to the inner radii to further reduce the inner radii.

8. The structure of claim 1, wherein the outer channel charge comprises a composite stiffener having a C-shaped cross-section.

9. The structure of claim 1, wherein the composite structure comprises an aircraft composite structure.

10. An aircraft comprising:
    a fuselage;
    at least one wing coupled to the fuselage, the at least one wing having a composite structure comprising:
       an outer channel charge and an inner channel charge, each having a vertical web portion transitioning to a horizontal flange, and each having an inner radius and an outer radius;
       a radius filler region formed at an intersection of the inner radii of the outer channel charge and the inner channel charge, the radius filler region having a generally triangular shape and filled with a radius filler;
       a base charge joined on one side to outer surfaces of the horizontal flanges of the outer channel charge and the inner channel charge, the base charge having a base side local material positioned along a length of a base side of the radius filler region and positioned outside of the radius filler region; and
       a charge of plies having a radial side local material positioned along each side of the inner radii of the outer channel charge and the inner channel charge, that reduce the inner radii,
       the outer channel charge and the inner channel charge, the radius filler region, the base charge, and the charge of plies, all forming the composite structure.

11. The aircraft of claim 10, wherein the charge of plies comprises continuous plies comprising one of, individually interspersed continuous plies and stacked composite continuous plies.

12. The aircraft of claim 10, further comprising a segmented interlaminate radius filler having interlaminar filler segments between the charge of plies to space the charge of plies away from each other to create a T-section radius.

13. The aircraft of claim 10, wherein the base charge comprises a reduced base charge further comprising base charge local composite plies positioned along an interface of the base charge and the base side local material.

14. The aircraft of claim 10, further comprising multiple pockets of ply charges interleaved throughout or adjacent to the inner radii of the outer channel charge and the inner channel charge, that reduce the inner radii.

15. A method for forming a composite structure having a reduced area radius filler, the method comprising the steps of:
- forming an outer channel charge and an inner channel charge, each having a vertical web portion transitioning to a horizontal flange portion, and each having an inner radius and an outer radius;
- forming a radius filler region at an intersection of the inner radii of the outer channel charge and the inner channel charge, the radius filler region having a generally triangular shape;
- joining the horizontal flange portions of the outer channel charge and the inner channel charge to one side of a base charge, the base charge having a base side local material positioned along a length of a base side of the radius filler region and positioned outside of the radius filler region;
- adding a charge of plies having a radial side local material positioned along each side of the inner radii of the outer channel charge and the inner channel charge, to reduce the inner radii;
- coupling to the radius filler region a radius filler having radii that substantially correspond to the reduced inner radii; and,
- forming the composite structure having the reduced area radius filler, with the outer channel charge and the inner channel charge, the radius filler region, the base charge, and the charge of plies.

16. The method of claim 15, wherein the step of adding the charge of plies adjacent to the inner radii to reduce the inner radii comprises forming the charge of plies as continuous plies comprising one of, individually interspersed continuous plies and stacked composite continuous plies.

17. The method of claim 15, further comprising the step of using a segmented interlaminate radius filler having interlaminar filler segments between the charge of plies to space the charge of plies away from each other to create a T-section radius.

18. The method of claim 15, further comprising the step prior to forming the composite structure, the step of adding base charge local composite plies to the base charge, the base charge local composite plies positioned along an interface of the base charge and the base side local material, that further reduce the inner radii.

19. The method of claim 15, wherein the step of adding the charge of plies adjacent to the inner radii to reduce the inner radii comprises interleaving multiple pockets of ply charges throughout or adjacent the inner radii of the outer channel charge and the inner channel charge, that reduce the inner radii.

20. The method of claim 15, further comprising the step prior to forming the composite structure, the step of applying a full ply fabric and adhesive inner wrap between the base charge and the outer channel charge, between the base charge and the inner channel charge, between the base charge and the base side of the radius filler region, and applying adjacent to the inner radii to further reduce the inner radii.

* * * * *